April 7, 1925.
D. G. LORRAINE
VALVE
Filed Dec. 23, 1919
1,532,251
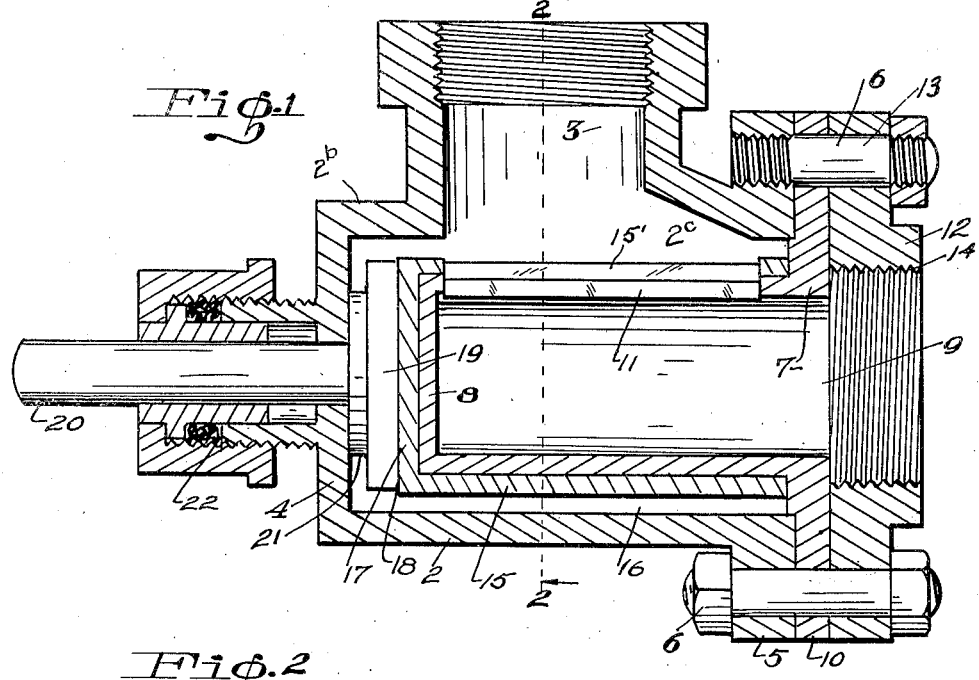
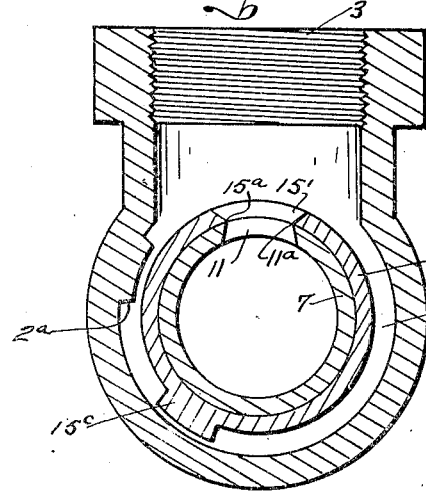
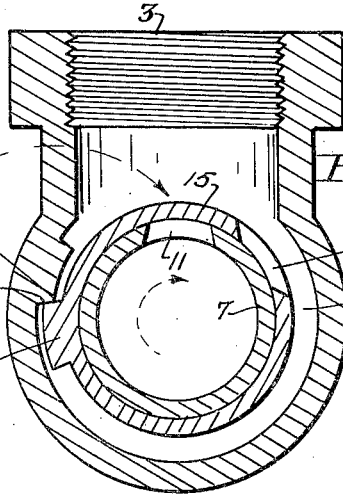
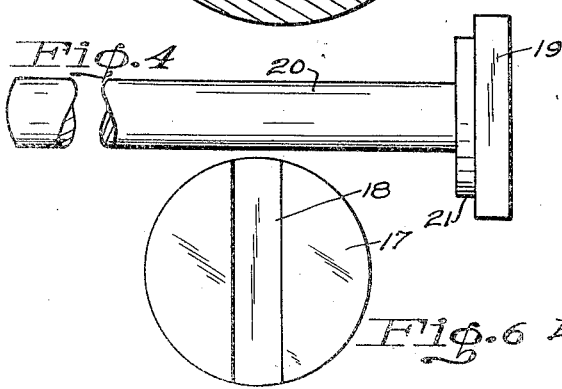
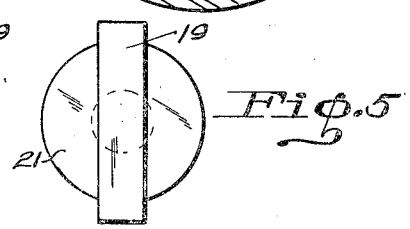
INVENTOR
D.G.Lorraine
BY Hazard & Miller
ATT'YS Patented Apr. 7, 1925.

1,532,251

UNITED STATES PATENT OFFICE.

DAVID G. LORRAINE, OF LOS ANGELES, CALIFORNIA.

VALVE.

Application filed December 23, 1919. Serial No. 346,967.

*To all whom it may concern:*

Be it known that I, DAVID G. LORRAINE, a citizen of the United States, residing at Los Angeles, in the county of Los Angeles and State of California, have invented new and useful Improvements in Valves, of which the following is a specification.

This invention relates to valves, and more particularly to a valve designed to operate efficiently in combination with apparatus whereby gases, oil, and solids are continuously separated from mineral or crude oils coming from wells, and the invention has for its object to provide a valve that is not only efficient and durable but which is compact in organization, is simple in construction, and which is provided with means making it self-cleaning.

A further object is to provide a valve in which the movable closure member is balanced and, therefore, easily operable; to provide a valve in which the parts subjected to the heaviest wear are readily removable for inspection and renewal or replacement and in which the durability of the parts is enhanced by keeping the same clean to overcome wear; and to provide for the tight closure of the outlet of the valve in a novel manner.

The invention consists of the construction and details, an embodiment of which is illustrated in the accompanying drawings and described and claimed hereinafter.

Figure 1 is a central longitudinal section through the valve and through the inlet and outlets thereof, the valve port being open.

Fig. 2 is a transverse section on the line 2—2 of Fig. 1.

Fig. 3 is a section on the same line showing the valve port closed.

Fig. 4 is a side elevation of the valve stem.

Fig. 5 is an end view of the head of the valve stem.

Fig. 6 is a view of the valve sleeve showing the stem-engaging end.

My improved valve comprises essentially a substantially L-shaped casing 2, consisting of a main body portion $2^b$ and a threaded inlet 3; the latter extending from one side of the portion $2^b$ and preferably at right angles to its axis. The body portion $2^b$ is closed at one end 4 and open at its opposite end; and has a circumferential flange 5, extending outwardly from said open end, to receive bolts 6. A cylindrical sleeve 7, having a closed end 8 and an open end 9, extends into the central chamber $2^c$, of the body portion $2^b$, and is preferably held in co-axial relation with the latter by means of its attaching flange 10. The flange 10 is apertured to register with the flange 5 to receive bolts 6. This inner sleeve 7 forms, substantially, the seat of the valve, and has a longitudinal slot, or outlet port, 11, disposed toward the inlet opening 3. The sleeve 7 is readily removable, being clamped in place between a flanged head 12 and the flange 5. The head 12 is internally screw-threaded, as at 14, to receive a pipe or other fitting; and is also provided with apertures 13, for the reception of the bolts 6, by means of which it and the sleeve 7 are secured to the casing 2.

Snugly fitting over and rotatably mounted on the cylindrical inner body or sleeve 7 is a removable valve or closure member comprising a sleeve 15 of suitable proportions and of somewhat less diameter than the bore or chamber $2^c$ of the casing 2 so as to form an annular space 16, Figs. 2 and 3, for the free passage of fluid entirely around the valve sleeve 15 to equalize pressure thereon. The valve sleeve 15 is open at one end to pass freely onto the central sleeve 7 and has its opposite end closed by a head 17, the outer face of which is diametrically slotted as at 18 to take a diametrical cross bar 19 formed on the adjacent headed end 21 of a rock shaft or stem 20 extending outwardly through the head 4 or end wall of the body 2 and passing through a packing gland 22. The head 21 of the stem 20 is shown as cylindrical or in disc-like form so as to seat against the adjacent end wall 4.

The valve sleeve or cylinder 15 is provided at one side with a port 15' of substantially equal area to the port 11 of the valve body 7, so that when the stem 20 is rocked through a suitable degree of movement the port 11 can be closed or opened as desired by the registration or removal of the port 15.

One of the features of the invention comprises the formation of comparatively sharp cutting lips or edges $15^a$ and $11^a$ along the contiguous corners of the walls of the ports 15' and 11 so that during the oscillation of the relatively movable parts these sharp edges or corners will operate to effectively cut off or remove accumulations of material from the surfaces that are alternately exposed. This will result in the increasing of the life of the valve parts as it prevents the accumulated fine hard particles that cause the rapid wear of overlapping relatively movable surfaces.

Another feature of the invention resides in providing means for causing the relatively movable part 15 of the valve to seat snugly over the surfaces of the part 7, and especially over the surface adjacent the port 11, when in closing position, and thus to prevent leak. This effective closing is secured by providing on a suitable portion of the rotary valve sleeve 15 an exterior lug 15ᵉ, a shoulder of which is designed to abut against a fixed shoulder or part as 2ᵃ formed on the inner wall of the casing 2, these members being brought into contact when the valve sleeve 15 is rotated to the closing position, with the result that the moment of force transmitted through the valve stem 20 causes that part of the sleeve 15 adjacent to the port 11 to swing on the arc a, Fig. 3, and seat in the manner of a flap valve tightly over the port 11.

Various changes may be made without departing from the spirit of my invention as claimed.

I claim:

1. A valve comprising a casing, a stationary cylinder having a peripheral port therein, a sleeve rotatably mounted on said cylinder and having a peripheral port therein adapted to register with the port in said cylinder, means for limiting the rotation of said sleeve on said cylinder, and means effective after the rotation of said sleeve has been stopped for causing adjacent portions of said sleeve and said cylinder to be moved into close contact for closing said ports.

2. A valve comprising a casing, a central fixed cylinder having a port, an outer sleeve rotatively mounted on said cylinder, said sleeve having a port adapted to register with the first mentioned port, and means to cause said sleeve to rotate eccentrically with reference to the central member to exert a pressure on its periphery adjacent its port when closed, said means comprising a fixed stop in the casing and a lug on the sleeve adapted to engage said stop when the valve port is closed.

3. A valve comprising a casing, a stationary cylinder therein having a peripheral port, a rotatable sleeve mounted on said cylinder and also having a peripheral port for registration with the port in the cylinder, a stop device for limiting the rotation of said sleeve for moving the port in said sleeve out of registration with the port in said cylinder, and for positively seating said sleeve on said cylinder for closing the ports against the passage of an element therethrough.

4. A valve comprising a casing, a central fixed cylinder having a port, an outer sleeve rotatively mounted on said cylinder, said sleeve having a port adapted to register with the first mentioned port, and means to cause said sleeve to rotate eccentrically with reference to the central member to exert a pressure on its periphery adjacent its port when closed, said means comprising a fixed stop in the casing and a lug on the sleeve adapted to engage said stop when the valve port is closed, to act as a pivotal point for the sleeve.

5. A valve comprising a casing, a central ported cylinder rigidly mounted in the casing, a ported sleeve valve rotatively mounted on the cylinder, and means to cause said sleeve to rotate eccentrically with reference to the central member to exert a pressure on its periphery adjacent its port when closed, said means comprising a fixed stop in the casing and a lug on the sleeve adapted to engage said stop when the valve port is closed, to act as a pivotal point for the sleeve, the stop and lug being so positioned that when they contact to form said pivot the sleeve will have its closest contact with the cylinder adjacent the port of the latter.

6. A valve comprising a casing having a closed end and an open end, a cylinder insertable in said casing and stationarily held therein at the open end, a sleeve rotatably mounted on said cylinder within said casing, and having a diametrically disposed groove in the closed end thereof, a valve operating stem rotatably supported in the closed end of said casing and having a tongue on the inner end thereof seating in the groove in said sleeve, said cylinder and said sleeve having correspondingly formed ports in the peripheries thereof adapted for registration, a stop for limiting the rotation of said sleeve on said cylinder when said ports are out of registration, the movement of said stem after the stopping of said sleeve serving to firmly seat said sleeve on said cylinder.

7. A valve comprising a casing having a closed end and an open end, a valve actuating stem extending through the closed end, a ported cylinder rigidly mounted in the open end, a ported sleeve rotatively mounted on said cylinder, said cylinder and sleeve having their ends adjacent the closed end of the casing closed, a diametral slot in the closed end of the sleeve and a key portion on the adjacent end of the valve stem adapted to slidingly engage said slot to rotate the sleeve, and means to cause said sleeve to rotate eccentrically with reference to the cylinder to exert a pressure on its periphery adjacent its port when closed, said means comprising a stop in the casing and a lug on the sleeve adapted to engage said stop to form a pivotal point for the sleeve.

8. In a valve, an inner cylinder having a longitudinal port with the edges thereof disposed at acute angles relative to radial lines, and a sleeve rotatably mounted thereon having a complementary port with its edges similarly formed, whereby the sharp corners serve to keep the running surfaces adjacent the ports clean, said sleeve telescoping said cylinder, and said sleeve and said cylinder closed at adjacent ends.

9. A valve comprising a casing closed at one end, a stem extending therethrough, a longitudinally disposed cylinder extending into said casing and having a flanged end to close the open end of the casing, means for removably securing the cylinder in place, a telescoping sleeve rotatively fitting the cylinder, the sleeve and the cylinder having contiguous closed ends and peripheral ports adapted for registration, the head of the sleeve and said stem having a cooperating slot and tongue adapted for rotating said sleeve on said cylinder and arranged for diametrical movement of said tongue in said slot, means for limiting rotation of said sleeve relative to said cylinder for moving said ports out of registration, the diametrical movement of said sleeve relative to said stem after said relative rotation has been stopped positively seating said sleeve on said cylinder for closing the ports against the passage of an element therethrough.

10. A valve comprising telescoping cylindrical members adapted for relative rotation thereof and having peripheral ports adapted to register, means for limiting relative concentric rotation of said members, and means effective after said relative concentric rotation has been stopped for causing eccentric relative movement of said members so as to move adjacent portions thereof into close contact for closing said ports.

11. A valve comprising telescoping cylindrical members adapted for relative rotation thereof and having peripheral ports adapted to register, the port in one of said members having its edges formed at acute angles with respect to radial lines whereby the sharp corners serve to keep the running surfaces of the members clean, means for limiting relative rotation of said members, and means effective after said relative rotation has been stopped for causing adjacent portions of said members to be moved into close contact for closing said ports.

12. A valve comprising telescoping cylindrical members, means for causing relative rotation of said members comprising a rotatable operating means engaging one of said members and arranged for diametrical movement of said member relative to said operating means, said members having peripheral ports adapted to register, and means for limiting relative rotation of said members, the diametrical movement of said member relative to said operating means after the relative rotation of the members has been stopped serving to move adjacent portions of said members into close contact for closing said ports.

13. A valve comprising telescoping cylindrical members adapted for relative rotation thereof and having peripheral ports adapted to register, and means for limiting relative rotation of said members for moving said ports out of registration and for positively seating said members against one another for closing the ports against the passage of an element therethrough.

14. A valve comprising telescoping cylindrical members adapted for relative rotation thereof and having peripheral ports adapted to register, the port in one of said members having its edges formed at acute angles with respect to radial lines, whereby the sharp corners serve to keep the running surfaces of the members clean, and means for limiting relative rotation of said members for moving said ports out of registration and for positively seating said members against one another for closing the ports against the passage of an element therethrough.

In testimony whereof I have signed my name to this specification.

DAVID G. LORRAINE.